United States Patent [19]
Gammie et al.

[11] Patent Number: 5,381,481
[45] Date of Patent: Jan. 10, 1995

[54] METHOD AND APPARATUS FOR UNIQUELY ENCRYPTING A PLURALITY OF SERVICES AT A TRANSMISSION SITE

[75] Inventors: Keith Gammie, Markham; Wayne S. Sheldrick; Arthur S. Woo, both of Scarborough, all of Canada; Anthony J. Wasilewski, Alpharetta, Ga.

[73] Assignee: Scientific-Atlanta, Inc., Atlanta, Ga.

[21] Appl. No.: 101,974

[22] Filed: Aug. 4, 1993

[51] Int. Cl.$^6$ .......................... H04L 9/00; H04L 27/30
[52] U.S. Cl. .............................................. 380/49; 380/9; 380/21; 380/29; 380/34; 380/43; 380/46; 375/1
[58] Field of Search ................... 380/9, 21, 34, 43, 46, 380/49, 29, 30, 3, 4, 6, 7, 10; 375/1

[56]  References Cited
U.S. PATENT DOCUMENTS

| | | | |
|---|---|---|---|
| 4,613,901 | 9/1986 | Gilhousen | 380/20 |
| 4,736,422 | 4/1988 | Mason | 380/20 |
| 4,802,215 | 1/1989 | Mason | 380/21 |
| 5,029,207 | 7/1991 | Gammie | 380/10 |
| 5,115,467 | 5/1992 | Esserman | 380/44 |

*Primary Examiner*—Bernarr E. Gregory
*Attorney, Agent, or Firm*—Woodcock Washburn Kurtz Mackiewicz & Norris

[57] ABSTRACT

Methods and apparatus are described for uniquely encrypting a plurality services at a transmission site and for decrypting selected services at a reception site while reducing the amount of encryption related information that must be transmitted to the reception site for decryption purposes. A unique spreading function is generated at the transmission site for each service to be transmitted. A random quantity is then transmitted, and the random quantity is convolved with each spreading function to produce a unique encryption seed for each service. At least a portion of each service is then encrypted using the unique encryption seeds produced for each service. Only the random quantity is transmitted to the reception site along with the encrypted portions of each service. None of the unique encryption seeds are transmitted. At the reception site, the unique spreading functions generated at the transmission site for each service are regenerated. A selected service is then decrypted by (i) convolving the received random quantity with the regenerated spreading function associated with the selected service to reproduce the unique encryption seed used to encrypt the received encrypted portion of the selected service at the transmission site, and (ii) decrypting the received encrypted portion of the selected service using the reproduced encryption seed. By transmitting only the random quantity, and then reproducing the encryption seeds at the reception site, the amount of encryption related information transmitted to the reception site is greatly reduced.

17 Claims, 6 Drawing Sheets

METHOD AND APPARATUS FOR UNIQUELY ENCRYPTING A PLURALITY OF SERVICES AT A TRANSMISSION SITE

CROSS REFERENCE TO RELATED APPLICATIONS

The subject matter of this application is related to the subject matter of co-pending U.S. patent application Ser. No. 07/984,461, filed Dec. 2, 1992, and entitled "METHODS AND APPARATUS FOR UNIQUELY ENCRYPTING DATA AT A PLURALITY OF DATA TRANSMISSION SITES FOR TRANSMISSION TO A RECEPTION SITE" (Attorney Docket: SA-0177), now U.S. Pat. No. 5,341,425.

BACKGROUND OF THE INVENTION

1. Field of the Invention

The present invention is related to signal encryption and decryption, and more particularly, to a method and apparatus for uniquely encrypting a plurality of services at a transmission site in a multi-service communications system and for decrypting the services at a remote reception site. The present invention reduces the amount of encryption related information that must be transmitted to the reception site for decryption purposes.

2. Background of the Invention

Although the background of the invention is described herein in the context of subscription television systems, the present invention is by no means limited thereto. Rather, the present invention may be employed in any multi-service communications system in which it is desirable to uniquely encrypt a plurality of individual services.

Figure 1:
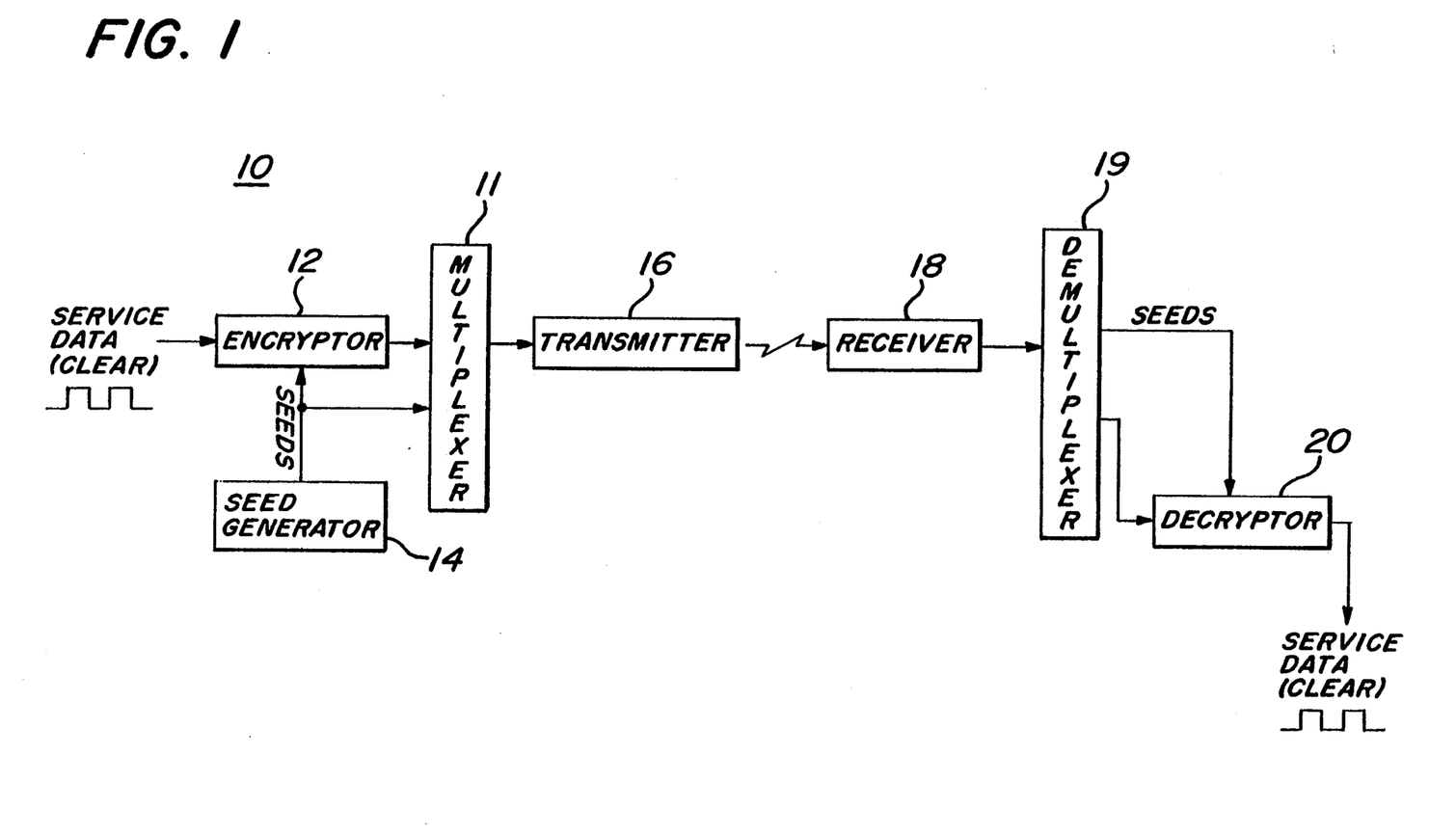
FIG. 1 is a block diagram of a prior art private key cryptographic system.

Preventing unauthorized access to transmitted television signals is of paramount concern to the subscription television industry. In the subscription television industry, "programmers" provide "services" for distribution to various reception sites. A "service" is a signal that contains some type of information, such as video, audio, closed-captioning or teletext information. A single programmer may wish to supply many services. Typically, a programmer will supply various services via satellite to cable television operators who, in turn, will provide the services to cable subscribers. Alternatively, a programmer may supply services directly to direct broadcast satellite (DBS) subscribers. Techniques for preventing unauthorized access to these services have become increasingly important. Cryptographic techniques, widely used in the computer security field, are ideal for preventing unauthorized access to services in a subscription television system. One form of cryptography, known as "private key" cryptography, is particularly well suited for such purposes. With private key cryptography, the transmitter and receiver share a common encryption key (sometimes also referred to as a "seed") that is used for both encrypting and decrypting. An exemplary cryptographic system 10 employing private key cryptography is depicted in FIG. 1. As shown, a service to be transmitted is provided to an encryptor 12. A seed generator 14 generates a unique encryption seed which is fed to the encryptor 12. Encryptor 12 encrypts the service in accordance with an encryption algorithm upon the encryption algorithm being "keyed" by the encryption seed. Encryption seeds are typically binary values having lengths that may range from 8 to 56 bits. Both the encryption seed and the encrypted service data are provided to a multiplexer 11 that multiplexes the encryption seed and encrypted service data and provides the multiplexed data signal to a transmitter 16. Transmitter 16 transmits the multiplexed data signal to a remote reception site. A receiver 18 at the reception site receives the multiplexed data signal and a demultiplexer 19 separates the encryption seed from the encrypted service data. The encrypted service data and encryption seed are then provided to a decryptor 20. Decryptor 20 employs the inverse of the encryption algorithm employed by encryptor 12, and therefore, upon "keying" the encryption algorithm with the received encryption seed, the decryptor 20 is able to decrypt the received service data.

Each programmer in a subscription television system typically provides many different services. For various reasons, programmers prefer to uniquely encrypt each service. Accordingly, a unique encryption seed must be generated for each service, and each unique encryption seed must somehow be provided to the reception site. U.S. Pat. Nos. 5,029,207 (Gammie), 4,613,901 (Gilhousen et al.), 4,736,422 (Mason) and 4,802,215 (Mason) each describe systems in which the encryption seeds used to encrypt each service are transmitted to a reception site along with the encrypted service data. For security reasons, the encryption seeds themselves are often encrypted prior to transmission. Co-pending application Ser. No. 07/984,461, which is cross-referenced above, describes a method and apparatus having particular applicability to the encryption of seeds at each of a plurality of programmer sites.

Additional security is typically provided by periodically changing the encryption seeds for each service at the transmission site. Frequently changing the encryption seeds hampers piracy efforts. However, because each new encryption seed must be transmitted to the reception site, bandwidth that would otherwise be available for service data is consumed. Moreover, the encryption seeds are often heavily error protected which results in even greater bandwidth consumption.

When the number of services being provided to subscribers is small, the bandwidth consumed by the transmission of encryption seeds is not a problem. With the advent of various compression technologies, however, the subscription television industry is experiencing a vast increase in the number of individual services that can be provided to subscribers. As the number of available services increases, the additional bandwidth needed for the transmission of encryption seeds becomes prohibitive. Consequently, there is a need for encryption methods and apparatus that reduce the amount of encryption related information that must be transmitted to a reception site, without sacrificing cryptographic strength. The present invention satisfied this need.

SUMMARY OF THE INVENTION

The present invention is directed to a method and apparatus for uniquely encrypting a plurality of services for transmission to a reception site. The present invention overcomes the limitations of the prior art by reducing the amount of encryption related overhead that must be transmitted to remote reception sites for decryption purposes.

According to the method of the present invention, a plurality of services, which may include, but are not limited to, video, audio, teletext and closed-captioning services, are each uniquely encrypted at a transmission site by (a) generating a unique spreading function for each service to be transmitted, (b) generating a random quantity, (c) for each service, (i) convolving the random quantity with the spreading function generated for that service in step (a) to produce a unique encryption seed for that service, and (ii) encrypting at least a portion of that service with the unique encryption seed, and (d) transmitting the random quantity to the reception site along with the encrypted portions of each service, but not transmitting the unique encryption seeds produced for each service. Because the unique encryption seeds for each service are not transmitted to the reception site, the amount of encryption related information transmitted to the reception site is greatly reduced.

According to one embodiment of the method of the present invention, a first component of the random quantity defines a global seed and a second component of the random quantity defines a random seed, and for each service, step (c)(i) comprises (a') combining the random seed with the spreading function generated for that service in step (a) in accordance with a data combining function, $F_0$, to produce a unique data quantity, (b') combining the random seed with the global seed and at least one other quantity in accordance with another data combining function, $F_1$, to produce an intermediate quantity, and then (c') processing the unique data quantity in accordance with an encryption function upon the encryption function being keyed by the intermediate quantity. At least a portion of the processed data quantity is then used to define the unique encryption seed for that service. Preferably, the random quantity is encrypted with a system key prior to transmitting the random quantity in step (d). Also, steps (b) through (d) are preferably repeated periodically to hamper cryptographic attacks.

At the reception site, the random quantity and the encrypted portions of each service are received. At least one of the services is then selected for decryption. According to the method of the present invention, the unique spreading function generated for the selected service at the transmission site is regenerated at the reception site in a manner identical to that performed at the transmission site in step (a). Next, the received random quantity and the regenerated spreading function to the selected service are convolved, in a manner identical to that performed at the transmission site in step (c)(i), to reproduce the unique encryption seed used at the transmission site in step (c)(ii) to encrypt the received encrypted portion of the selected service. Using the reproduced encryption seed, the encrypted portion of the selected service is then decrypted for use at the reception site.

An encryption apparatus according to the present invention comprises spreading function generator means for generating a unique spreading function for each of the services to be transmitted, and a random signal generator for generating a random quantity. Seed generator means are coupled to the random signal generator and to the spreading function generator means for independently convolving the random quantity with each of the spreading functions to produce a unique encryption seed for each respective service. A plurality of service encryptors are also provided. Each service encryptor is coupled to the seed generation means and is coupled to receive a respective one of the services for encrypting the respective service in accordance with an encryption algorithm upon the encryption algorithm being keyed by the unique encryption seed produced for that respective service. A transmitter is coupled to each of the encryptors and to the random signal generator for transmitting the random quantity and each of the encrypted services to a remote reception site. The transmitter does not transmit the unique encryption seeds produced by the encryption seed generator means. Consequently, the amount of encryption related information transmitted to the reception site is greatly reduced.

A decryption apparatus according to the present invention comprises a receiver for receiving the random quantity and the encrypted services from the encryption apparatus, and a selection switch for selecting one of the received encrypted services for decryption. A spreading function generator is provided for regenerating, in a manner identical to that performed by the spreading function generator means of the encryption apparatus, the unique spreading function generated at the transmission site for the selected service. A seed generator is coupled to the receiver and to the spreading function generator for convolving the regenerated spreading function with the received random quantity, in a manner identical to that performed by the seed generator means of the encryption apparatus, to reproduce the unique encryption seed produced at the transmission site and used to encrypt the selected service. A service decryptor is coupled to the receiver and to the seed generator for decrypting the selected received encrypted service using the reproduced encryption seed.

Further features and details of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Before proceeding to the description of the drawings, it should be understood that, although the present invention has particular applicability to a subscription television system, the present invention is in no way limited thereto. Rather, the present invention may be employed in any multi-service communications system that requires unique encryption of a plurality of independent services. Furthermore, although the present invention is described herein as being employed to encrypt digital service signals, the methods and apparatus disclosed herein may equally be employed to encrypt or scramble analog service signals.

Figure 2:
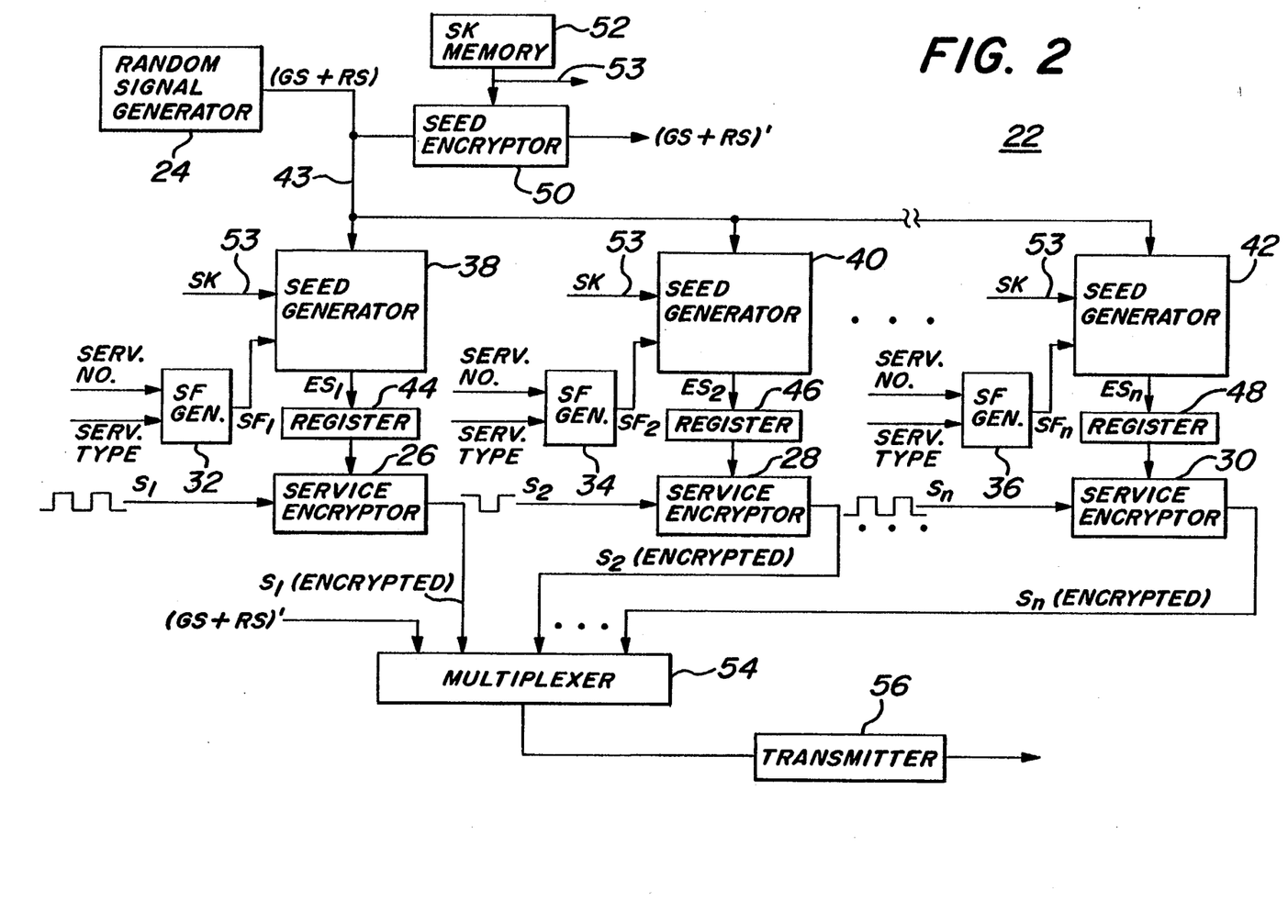
FIG. 2 is a functional block diagram of an encryption apparatus for uniquely encrypting each of a plurality of services in accordance with a preferred embodiment of the present invention.

Referring now to the drawings wherein like numerals indicate like elements throughout, there is shown in FIG. 2 a functional block diagram of one embodiment of an encryption apparatus 22 for uniquely encrypting each of a plurality of services in accordance with the present invention. As shown, the apparatus 22 comprises a random signal generator 24 for generating a random quantity, which in the preferred embodiment comprises two components: a global seed ("GS"), and a random seed ("RS"). Preferably, the random signal generator 24 comprises a thermal diode that generates a digital signal comprising a random sequence of bits. In the present embodiment, the random quantity comprises eighty-eight (88) bits, a first fifty-six bits defining the global seed, and the remaining thirty-two bits defining the random seed. It is understood, however, that in other embodiments, the number of bits in the random quantity and the number of bits defining the global and random seeds may differ.

The apparatus 22 further comprises a seed encryptor 50 which is coupled to the random signal generator 24 for encrypting the random quantity (GS+RS) in accordance with an encryption algorithm upon that algorithm being "keyed" by a system key, SK, provided to the encryptor from a register 52. According to the present embodiment, the system key comprises a 56-bit pseudo-random data word, however, in other embodiments, the system key may comprise a different number of bits. Any encryption algorithm may be employed by the seed encryptor 50. For example, the well known "Data Encryption Standard" algorithm ("DES") may be employed.

Services to be encrypted, e.g., services $S_1, S_2 \ldots S_N$, are provided to respective service encryptors 26, 28 . . . 30. Each service comprises a continuous digital signal that may contain one of several different types of information. For example, one service may be a video service comprising a digital video signal, and another service may be an audio service comprising a digital audio signal. Other service types include, but are not limited to, teletext, closed-captioning, and computer data services. Each service is assigned a unique service number. A service type identifier and a service number identifier are provided for each service. Assuming a system capable of transmitting a maximum of 64 different services, each service number identifier might comprise a unique 6-bit quantity. Similarly, assuming a system having thirty-two different service types, each service type identifier might comprise a unique 5-bit quantity indicative of a particular type of service. The combined effect of a 6 bit service number and a 5-bit service type identifier can generate up to 2048 unique spreading functions.

As illustrated in FIG. 2, the service type and service number identifiers for each service are provided to respective spreading function generators 32, 34 . . . 36. Each spreading function generator 32, 34 . . . 36 receives the service type and service number identifiers for a respective service and generates therefrom a unique spreading function (e.g., $SF_1, SF_2 \ldots SF_N$) for that service. According to the present embodiment, each spreading function generator 32, 34 . . . 36 implements a one-way function, wherein the service type and service number identifiers define inputs to the function. Any one-way function may be implemented so long as it does not generate the same spreading function for two different services. According to the present embodiment, each spreading function ($SF_1, SF_2 \ldots SF_N$) comprises a unique 12-bit quantity, it being understood that in other embodiments the spreading functions may comprise a different number of bits.

As an alternative, each spreading function generator 32, 34 . . . 36 may comprise an identical look-up table memory wherein each spreading function is prestored as an entry in the table, and the service type and service number identifiers for a particular service are combined to form an address for retrieving a unique spreading function from the stored table.

According to the present invention, a unique encryption seed is generated for each service by convolving the random quantity (GS+RS) with the unique spreading function (i.e., $SF_1, SF_2$ or $SF_N$) generated for that service. To this end, the encryption apparatus 22 of FIG. 2 further comprises a plurality of seed generators 38, 40 . . . 42. As shown, each seed generator 38, 40 . . . 42 is coupled, via line 43, to the random signal generator 24 for receiving the random quantity (GS+RS) from the random signal generator 24. Each seed generator 38, 40 . . . 42 is also coupled to a respective one of the spreading function generators 32, 34 . . . 36 for receiving a spreading function from the respective spreading function generator. As described in greater detail below, each seed generator 38, 40 . . . 42 convolves the random quantity (GS+RS) with a respective spreading function (i.e., $SF_1, SF_2 \ldots SF_N$) to produce a unique encryption seed for a respective one of the services. For example, seed generator 38 receives the random quantity via line 43 and convolves the random quantity with the spreading function, $SF_1$, generated by spreading function generator 32 to produce a unique encryption seed, $ES_1$, for service $S_1$. Similarly, seed generator 40 receives the random quantity and convolves it with the spreading function, $SF_2$, generated by spreading function generator 34 to produce a unique encryption seed, $ES_2$, for service $S_2$, and so on. As explained below in greater detail, in the preferred embodiment, each seed generator 38, 40 . . . 42 generates a unique 64-bit quantity, any portion of which may be used to define the encryption seed, ES, for its respective service. However, in other embodiments, a different number of bits may be generated by each seed generator 38, 40 . . . 42.

As shown, the unique encryption seeds (i.e., $ES_1, ES_2 \ldots ES_N$) produced by the respective seed generators 38, 40 . . . 42 are temporarily stored in respective seed registers 44, 46 . . . 48. Subsequently, each encryption seed is provided from its respective seed register 44, 46 . . . 48 to a respective service encryptor 26, 28 . . . 30. Each encryptor 26, 28 . . . 30 is responsible for encrypting the data of a respective one of the services. For example, encryptor 26 is responsible for encrypting the data of service $S_1$, encryptor 28 is responsible for encrypting the data of service $S_2$, and so on. Each encryptor 26, 28 . . . 30 encrypts the data of its respective service in accordance with an encryption algorithm upon the encryption algorithm being "keyed" with the unique encryption seed provided from its respective seed register 44, 46 . . . 48. For example, encryptor 26 encrypts the data of service $S_1$ in accordance with the encryption algorithm upon that algorithm being keyed by encryption seed $ES_1$ provided from seed register 44.

According to the present embodiment, each encryptor 26, 28 . . . 30 employs the same encryption algorithm, although, in other embodiments, different ones of the encryptors 26, 28 . . . 30 may employ different encryption algorithms. Furthermore, any encryption algorithm may be employed. For example, each encryptor 26, 28 . . . 30 may employ the well known "Data Encryption Standard" algorithm (DES).

According to a most preferred embodiment, each seed generator 38, 40. . .42 convolves both the random quantity (GS+RS) and the system key (SK) with a respective one of the spreading functions $SF_1$, $SF_2$. . . $SF_N$ to generate its respective encryption seed $ES_1$, $ES_2$. . . $ES_N$. As illustrated in FIG. 2, therefore, each seed generator 38, 40 . . . 42 receives the system key, SK, from register 52 via line 53. Convolving both the random quantity and the system key with each spreading function enhances the cryptographic strength of the apparatus.

As shown, the encrypted data of each service $S_1$, $S_2$. . . $S_3$ is provided to a multiplexer 54. The multiplexer 54 also receives the encrypted random quantity (GS+RS)'. The multiplexer 54 multiplexes the encrypted random quantity and encrypted service data to produce a multiplexed data signal that is then provided to a transmitter 56 for transmission to a remote reception site. Thus, according to the present invention, only the encrypted random quantity (GS+RS)' and the encrypted data of each service $S_1$, $S_2$. . . $S_N$ are transmitted to the remote reception site. None of the unique encryption seeds $ES_1$, $ES_2$. . . $ES_N$ are transmitted. Consequently, the amount of encryption related information transmitted to the reception site is greatly reduced.

Although the encryption seeds generated from a given random quantity (RS+GS) may be used to encrypt their respective services for an indefinite period of time, it is preferable to change the encryption seeds on a frequent basis in order to hamper cryptographic attacks. According to the present invention, the encryption seeds, i.e. $ES_1$, $ES_2$. . . $ES_N$, may be changed by simply generating a new random quantity and providing that quantity to each seed generator 38, 40 . . . 42. Upon receiving a new random quantity, each seed generator 38, 40 . . . 42 will generate a new encryption seed in the manner described above, and once generated, the new encryption seeds may then be employed by the respective service encryptors 26, 28 . . . 30. For a given service, therefore, each new encryption seed is used to encrypt a different, but consecutive, portion of that service's data stream. As with the initial random quantity, each new random quantity is encrypted by the seed encryptor 50 and provided to the multiplexer 54 for transmission to the reception site. As always, only the random quantities are transmitted to the reception site along with the encrypted service data. None of the encryption seeds are transmitted.

Figure 3:
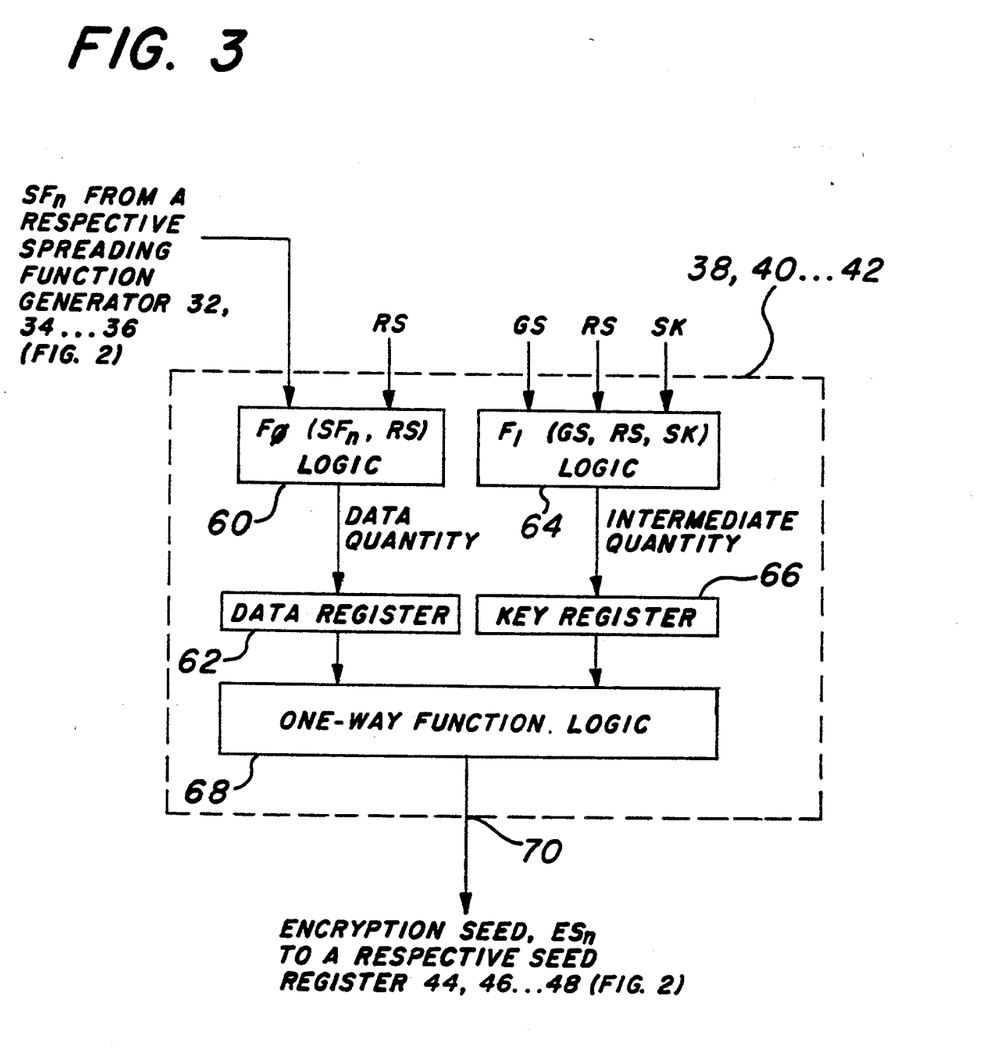
FIGS. 3 illustrates further details of the encryption apparatus of FIG. 2.

FIG. 3 is a functional block diagram illustrating further details of each seed generator 38, 40 . . . 42. As shown, each seed generator 38, 40 . . . 42 comprises first and second data combiners 60, 62. The first data combiner 60 receives, at respective inputs, the random seed component (RS) of the random quantity (RS+GS) and a spreading function $SF_n$ from a respective one of the spreading function generators 32, 34 . . . 36 (FIG. 2). The first data combiner 60 combines the spreading function with the random seed in accordance with a data combining function, $F_0$, to produce a unique data quantity (i.e., data quantity=$F_0(SF_n, RS)$), which is then temporarily stored in a data register 62. The data combining function $F_0$ implemented by the first data combiner 60 may comprise any function capable of combining the spreading function with the random seed, and the present invention is not limited to any one function. For example, data combining function F0 may comprise a concatenation function which appends selected portions of the random seed to the spreading function to produce the data quantity. Alternatively, the data combining function $F_0$ may comprise a more complex one-way function. According to the preferred embodiment, the unique data quantity generated by the data combiner 60 comprises 64-bits, however, in other embodiments, the data quantity may comprise a different number of bits.

The second data combiner 64 receives both the global seed (GS) and random seed (RS) components of the random quantity and combines these with the system key (SK) in accordance with another data combining function, $F_1$, to produce an intermediate quantity (i.e., intermediate quantity=$F_1$(GS, RS, SK)), which is then temporarily stored in a key register 66. Like data combining function $F_0$, data combining function $F_1$ implemented by the second data combiner 64 may comprise any data combining function, and the present invention is not limited to any one function. For example, data combining function $F_1$ may comprise a simple concatenation function which concatenates selected portions of the random seed, global seed and system key to produce the intermediate quantity. Alternatively, the data combining function $F_1$ may comprise a more complex one-way function. According to the preferred embodiment, the intermediate quantity produced by the second data combiner 64 comprises 56-bits however, in other embodiments, the intermediate quantity may comprise a different number of bits.

The data register 62 and key register 66 are both coupled to a one-way function means 68 which processes (i.e., "encrypts") the data quantity in the data register 62 in accordance with an encryption function upon the encryption function being keyed with the intermediate quantity in the key register 66. At least a portion of the processed data quantity defines a unique encryption seed, $ES_n$, which is the provided, via an output 70, to a respective one of the seed registers 44, 46 . . . 48 (FIG. 2). Although the one-way function means 68 may implement any encryption function, in the preferred embodiment, the one-way function means 68 implements the "Data Encryption Standard" algorithm (DES) in electronic codebook (ECB) mode. The DES algorithm in electronic codebook mode provides a cryptographically strong one-way function which, upon being keyed by the 56-bit intermediate quantity stored in the key register 66, generates a unique 64-bit output from the 64-bit data quantity stored in the data register 62. Accordingly, up to 64-bits are available for defining an encryption seed. Of course, in other embodiments, the encryption function may produce a different number of output bits, and the present invention is by no means limited to an output of 64 bits.

Referring again to FIG. 2, as mentioned above, the encryption seeds generated by each seed generator 38, 40 . . . 42 are provided to respective seed registers 44, 46 . . . 48. Each encryption seed is then used to encrypt a respective one of the services $S_1$, $S_2$. . . $S_N$. Although the entire 64-bit quantity provided by a given seed generator 38, 40 . . . 42 is available for defining an encryption seed, it may be desirable in some applications to use less than the entire 64-bits. For example, in some applications, the service encryptors 26, 28 . . . 30 may be implemented to receive shorter encryption seeds. In such cases, each encryption seed may be defined as a smaller portion of the respective 64-bit seed generator output. Also, in some applications, certain services may not need to be encrypted as strongly as others, and therefore, some of the encryptors 26, 28 . . . 30 may implement different encryption algorithms requiring different size encryption seeds. For example, digital cable television operators may want to encrypt video service signals more strongly than audio service signals. Consequently, the service encryptors used to encrypt the video services may implement a different encryption algorithm than the service encryptors used to encrypt audio services, and each of the encryption algorithms may require different size encryption seeds. Accordingly, a different number of bits may be used to define encryption seeds for encrypting the different types of services.

As can be appreciated, the encryption apparatus 22 of the present invention contains a certain degree of functional redundancy. For example, although the apparatus 22 of FIG. 2 employs a separate spreading function generator 32, 34 . . . 36, seed generator 38, 40 . . . 42, seed register 44, 46 . . . 48 and service encryptor 26, 28 . . . 30 for each service, much of the functionality of these elements is identical from service to service and can be combined into a single functional element. For example, a single spreading function generator, seed generator, seed register and service encryptor could be employed in place of the multiple elements illustrated in FIG. 2. Of course, in such an embodiment, the single set of elements would have to be shared among the services, only one service being encrypted at any given time.

According to one embodiment of the encryption apparatus 22 of the present invention, the functionality of the spreading function generators 32, 34 . . . 36, seed generators 38, 40 . . . 42, seed registers 44, 46 . . . 48, and service encryptors 26, 28 . . . 30 is implemented in a secure microprocessor (not shown). Any suitable secure microprocessor may be employed. For example, a Motorola MC68HC05SC21 secure microprocessor may be employed.

Figure 4:
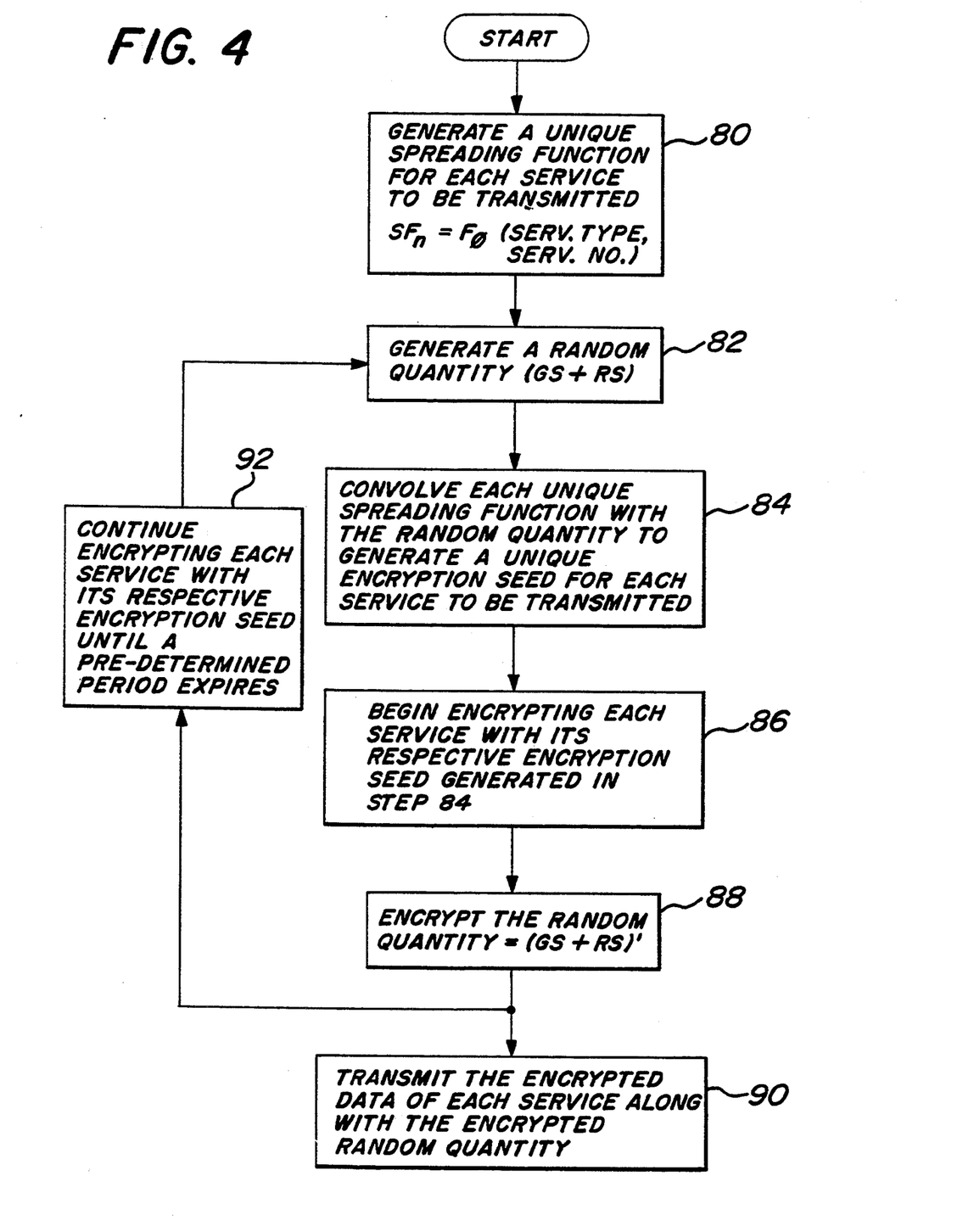
FIG. 4 is a flow chart illustrating both the operation of the apparatus of FIG. 2 and a preferred embodiment of a method of the present invention.

FIG. 4 is a flow chart illustrating both the operation of the apparatus of FIG. 2 and a preferred embodiment of a method of uniquely encrypting a plurality of services at a transmission site in accordance with the present invention. As shown, the method of the present invention begins at step 80 wherein a unique spreading function is generated for each service based on a service number identifier and a service type identifier for that service. Next, at step 82, a random quantity comprising two components, a global seed and a random seed, is generated. At step 84, each of the unique spreading functions is independently convolved with the random quantity generated in step 82 to produce a unique encryption seed for each of the services to be transmitted.

At step 86, the unique encryption seeds generated for each service are fed to their respective service encryptors (e.g., service encryptors 26, 28 . . . 30 of FIG. 2) which begin encrypting their respective services in accordance with an encryption algorithm upon the encryption algorithm being "keyed" with the respective unique encryption seeds generated in step 84. At step 88, the random quantity generated in step 82 is encrypted with a system key. As illustrated at step 90, as the data for each service is encrypted, the encrypted data is transmitted to a remote reception site along with the encrypted random quantity. As shown at step 92, encryption of each service continues using the current encryption seeds until a predetermined period of time expires.

When the predetermined period of time expires, control passes back to step 82 where a new random quantity is generated. At step 84, each unique spreading function is convolved with the new random quantity to generate a new unique encryption seed for each service. At step 86, the previous set of unique encryption seeds are replaced with the newly generated encryption seeds, and independent encryption of each service continues using the new encryption seeds, i.e., the new encryption seeds replace the previous encryption seeds as the initiating values for the encryption algorithm implemented by each of the respective service encryptors 26, 28 . . . 30.

For reasons which will become evident hereinafter, each new random quantity must be transmitted to the reception site. Accordingly, like the previous random quantity, the new random quantity is encrypted at step 88, and as shown at step 90, the encrypted new random quantity is transmitted to the reception site along with the encrypted data for each service. As explained above, each service comprises a continuous data stream, and therefore, the encrypted data of each service is continuously being transmitted in step 90. Each new random quantity, however, need only be transmitted once (i.e., when it is generated). Of course, each new random quantity could be transmitted multiple times if desired.

As with the previous set of encryption seeds (produced with the previous random quantity), encryption of each service continues with the current set of respective encryption seeds until the predetermined period of time again expires. After the predetermined period of time has expired, control again passes back to step 80 where yet another random quantity is generated. The process may continue in this manner indefinitely. As can be appreciated, each new random quantity is used to generate a new set of respective encryption seeds, one for each service to be transmitted. For each service, each new encryption seed is used to encrypt a different, but consecutive portion of that service. Most importantly, in accordance with the present invention, only each new random quantity is transmitted to the reception site along with the encrypted service data; none of the unique encryption seeds are transmitted. As explained hereinafter, at the reception site, the unique encryption seeds used to encrypt each service can be reproduced using the transmitted random quantity. Because only the random quantity need be transmitted to the reception site, the amount of encryption related information transmitted to the reception site is greatly reduced without sacrificing cryptographic strength.

Figure 5:
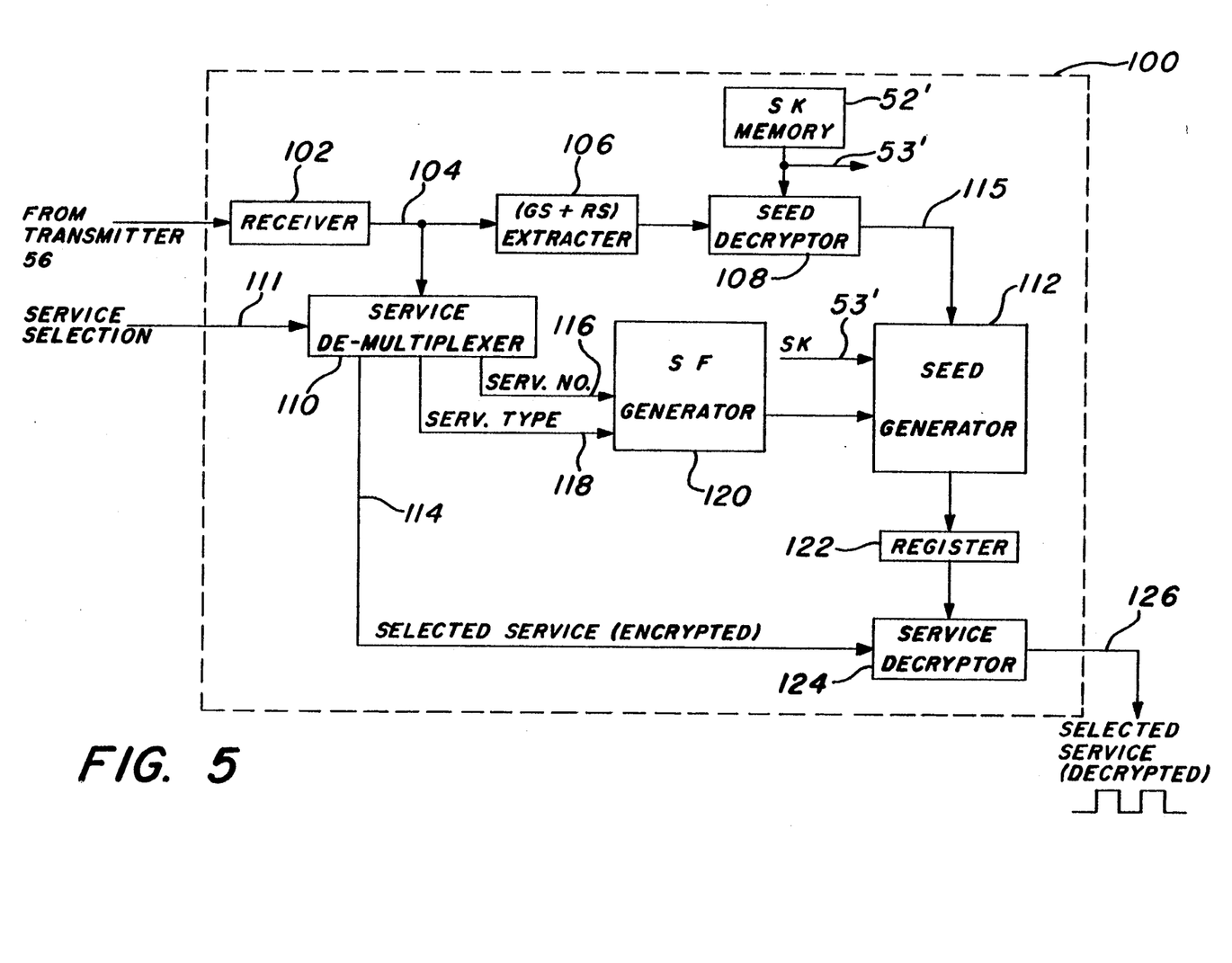
FIG. 5 is a functional block diagram of a decryption apparatus for use in conjunction with the encryption apparatus of FIG. 2.

FIG. 5 is a functional block diagram of a decryption apparatus 100 for use at a remote reception site in conjunction with the encryption apparatus 22 of FIG. 2. In particular, the decryption apparatus 100 provides a means for decrypting a selected one of the encrypted services transmitted to the reception site by the encryption apparatus 22 of FIG. 2. As shown, the decryption apparatus 100 comprises a receiver 102 for receiving a multiplexed data signal containing the encrypted data for each of a plurality of services and at least one encrypted random quantity (GS+RS) comprising two components, a global seed (CS) and a random seed (RS). Once received, the multiplexed data signal is provided to a data extractor 106 and a service demultiplexer 110.

The data extractor 106 monitors the incoming data signal and extracts the encrypted random quantity from the signal. Once extracted, the encrypted random quantity is provided to a seed decryptor 108 which implements the inverse of the encryption algorithm implemented by the seed encryptor 50 of the encryption apparatus 22 of FIG. 2. A register 52' in the decryption apparatus 100 stores a copy of the system key, SK, used to encrypt the random quantity in the encryption apparatus 22. Any means may be employed for providing the decryption apparatus 100 with a copy of the system key, SK. For example, the system key may be delivered to the reception site via human courier and then manually stored in the decryption apparatus 100. Alternatively, the system key may be transmitted to the reception site, however, if the system key is to be transmitted, it too must be encrypted prior to transmission. Encryption of the system key may be achieved using a unique secret serial number assigned to the decryption apparatus 100 and permanently stored in a secure memory (not shown) of the apparatus 100 at the time of manufacture. Such a technique is described in U.S. Pat. No. 5,029,207, issued to the same assignee, and incorporated herein by reference (as described therein, the system key is referred to as a "key-of-the-month").

Using the system key as the initiating value for the encryption algorithm, the seed decryptor 108 decrypts the encrypted random quantity and provides the decrypted random quantity to a seed generator 112 via line 115. Seed generator 112 is identical to the seed generators 38, 40 ... 42 of the encryption apparatus 22 (FIG. 2), details of which are described above and illustrated in FIG. 3. As shown, the seed generator 112 also receives the system key via line 53'.

The service demultiplexer 110 receives the multiplexed data signal via line 104 and a service selection signal via line 111. A user at the reception site provides the service selection signal using a selection switch (not shown), which may take the form of a hand-held remote control device, or some other input device. Based on the user's selection, the service demultiplexer 110 extracts the encrypted data of the selected service from the incoming multiplexed data signal and provides the encrypted data of the selected service to a service decryptor 124. Service decryptor 124 must implement the inverse of the encryption algorithm implemented by the particular service encryptor 26, 28 ... or 30 used in the encryption apparatus 22 to encrypt the data of the selected service.

Based on the user's service selection, the service demultiplexer 110 also provides the service number identifier and service type identifier for the selected service to a spreading function generator 120 which is identical to each of the spreading function generators 32, 34 ... 36 of the encryption apparatus 22 of FIG. 2. The service number and service type identifiers for each service may either be stored in the service demultiplexer or transmitted to the decryption apparatus as part of the multiplexed data signal. The spreading function generator 120 receives the service number and service type identifiers from the service de-multiplexer 110 and regenerates therefrom the unique spreading function generated for the selected service by the respective spreading function generator 32, 34 ... or 36 in the encryption apparatus 22 of FIG. 2. The regenerated spreading function for the selected service is then provided to the seed generator 112.

According to the present invention, the seed generator 112 convolves the regenerated spreading function with the received random quantity and the system key, in a manner identical to that performed by each seed generator 38, 40 ... 42 in the encryption apparatus 22, to reproduce the unique encryption seed used in the encryption apparatus 22 to encrypt the data of the selected service. Once reproduced, the unique encryption seed for the selected service is provided as a "key" to the service decryptor 124. Using the reproduced encryption seed as an initiating value, the service decryptor 124 decrypts the encrypted data for the selected service and provides the decrypted service data at an output 126 of the apparatus 100.

As explained above, in the preferred embodiment, a new random quantity is periodically generated by the encryption apparatus 22 of FIG. 2 to hamper cryptographic attacks, and for a particular service, each new random quantity produces a new unique encryption seed and each new encryption seed is used to encrypt a different, but consecutive, portion of the service's data stream. As with the initial random quantity, each new random quantity is transmitted to the reception site in encrypted form. Accordingly, at the reception site, each new random quantity must be received by the receiver 102 of the decryption apparatus 100, extracted from the incoming data stream by the data extractor 106, decrypted by the seed deceptor 108 and provided to the seed generator 112 so that, for the selected service, the seed generator 112 can reproduce the unique encryption seed generated for that service from that random quantity. Furthermore, as can be appreciated, a means (not shown) must be provided for synchronizing the reproduction of each successive encryption seed with the incoming encrypted data of the selected service so that each reproduced encryption seed is provided to the service decryptor 124 in time for decrypting its respective portion of the selected service's data stream.

Although the decryption apparatus 100 of FIG. 5 is illustrated as being capable of only selecting one service from the incoming multiplexed data signal, the decryption apparatus 100 of the present invention is by no means limited to operation in this manner. For example, more than one service could be selected at a given time, and the decryption apparatus could include additional spreading function generators, seed generators, seed registers and service decryptors (not shown) for each of the selected services. Such an embodiment might find particular applicability in a subscription television system wherein subscribers typically select "programs" which comprise a combination of related services, such as a video service, and its associated audio and closed-captioning services. Moreover, in such an embodiment, the service decryptors used to decrypt each of the different types of services may employ different encryption algorithms, and as mentioned above, a different number of bits may be used to define the unique encryption seeds for each of the different service types.

Figure 6:
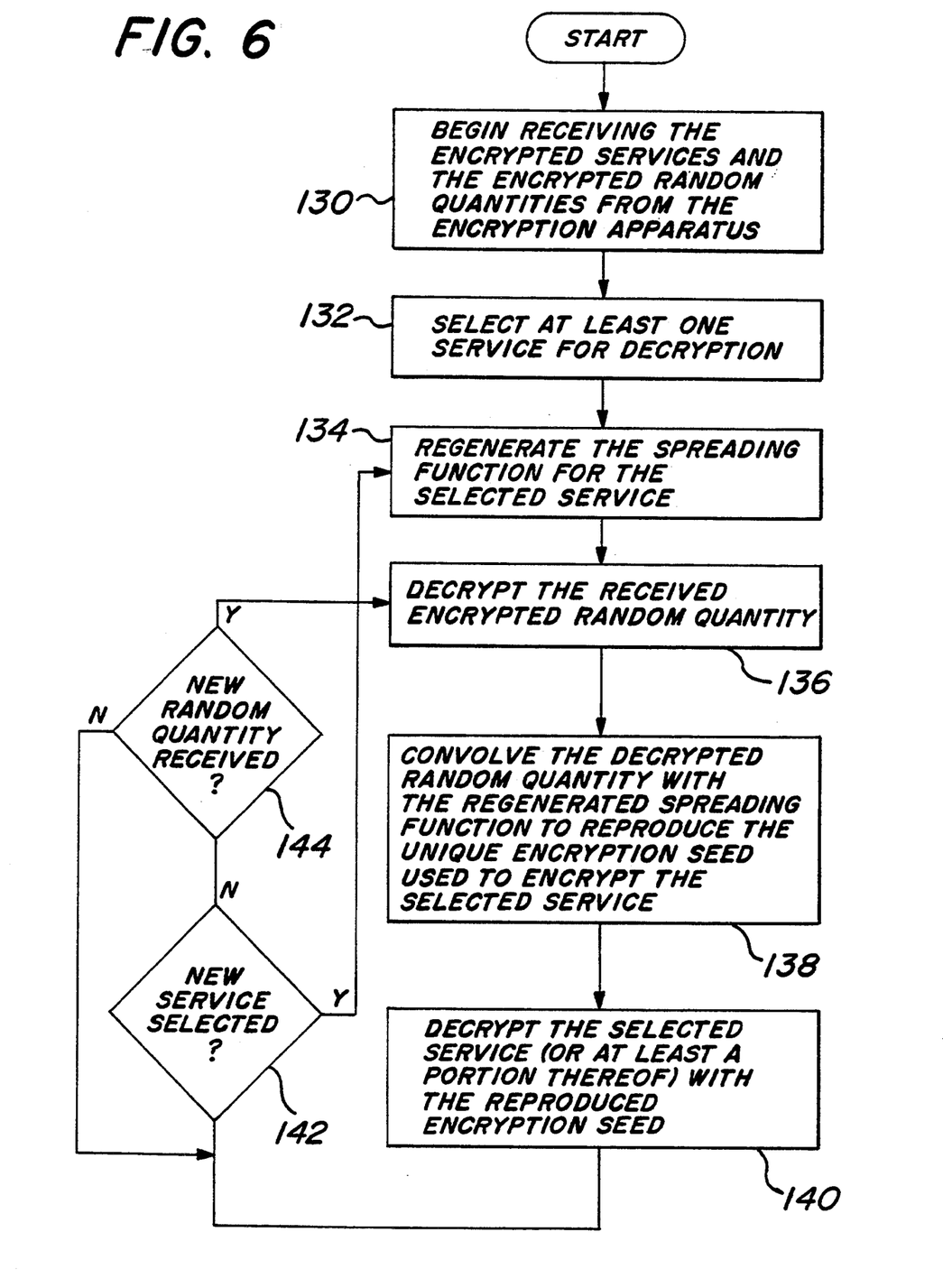
FIG. 6 is a flow chart illustrating both the operation of the apparatus of FIG. 5 and further details of the preferred embodiment of the method of the present invention.

FIG. 6 is a flow chart illustrating both the operation of the apparatus of FIG. 5 and further details of the preferred embodiment of the method of the present invention. At step 130, an encrypted random quantity (GS+RS)' and the encrypted data for each service transmitted from an encryption apparatus (e.g. apparatus 22 of FIG. 2) are received at a reception site. At step 132, one of the services is selected for decryption, and at step 134, the unique spreading function generated for that service in the encryption apparatus is regenerated at the reception site. At step 136, the received encrypted random quantity is decrypted, and at step 138, the decrypted random quantity is convolved with the regenerated spreading function, in a manner identical to that performed in the encryption apparatus, to reproduce the unique encryption seed used in the encryption apparatus to encrypt the data of the selected service. Next, at step 140, the data for the selected service is decrypted using the reproduced encryption seed. So long as the user does not select a different service (step 142), decryption of the incoming data of the currently selected service continues until a next random quantity is received. As illustrated at step 144, when a new random quantity is received, control passes to step 136 wherein the newly received random quantity is decrypted. Next, at step 138, the new random quantity is convolved with the regenerated spreading function to reproduce the encryption seed used in the encryption apparatus to encrypt the next subsequent portion of the selected service's data stream. At step 140, decryption of that next portion of the selected service's data stream is begun using the new reproduced encryption seed. As can be appreciated, the process continues in this manner as each successive portion of the selected service's data stream is decrypted with its respective reproduced encryption seed. If, at step 142, it is determined that a new service has been selected, then control passes to step 134 where the unique spreading function for the newly selected service is regenerated. Steps 136 through 144 are then performed as described above for the new service.

According to one embodiment of the decryption apparatus 100 of the present invention, the functionality of the spreading function generator 120, seed generator 112, seed register 122, and service decryptor 124 is implemented in a secure microprocessor (not shown). Any suitable secure microprocessor may be employed. For example, a Motorola MC68HC05SC21 secure microprocessor may be employed.

As described herein, the encrypted service data and the encrypted random quantities are transmitted in a multiplexed form. An exemplary multiplexed communication system in which the present invention may be employed is described in co-pending U.S. patent application Ser. No. 07/968,846, filed Oct. 30, 1992, and entitled "System and Method for Transmitting a Plurality of Digital Services", which is incorporated herein by reference. The aforementioned application describes an exemplary multiplex data stream format and the structure and operation of a multiplexer and demultiplexer for implementing that multiplex format. As is understood, however, the present invention is by no means limited to application in a multiplexed communications system. For example, the data for each service and the encrypted random quantities may be transmitted to the remote reception site on separate frequencies, and a separate receiver used at the reception site for each signal.

As the foregoing illustrates, the present invention is directed to a method and apparatus for uniquely encrypting a plurality of services for transmission to a reception site. The present invention overcomes the limitations of the prior art by reducing the amount of encryption related overhead that must be transmitted to remote reception sites. It is understood that changes may be made to the embodiments described above without departing from the broad inventive concepts thereof. Accordingly, this invention is not limited to the particular embodiments disclosed, but it is intended to cover all modifications that are within the scope and spirit of the invention as defined by the appended claims.

What is claimed is:

1. In a communications system wherein a plurality of services are to be transmitted from a transmission site to a reception site, a method for uniquely encrypting each service at the transmission site comprising the steps of:
    a) generating a unique spreading function for each service to be transmitted, wherein each unique spreading function comprises a unique N-bit quantity;
    b) generating a random quantity;
    c) for each service, (i) convolving the random quantity with the spreading function generated for that service in step (a) to produce a unique encryption seed for that service, and (ii) encrypting at least a portion of that service in accordance with an encryption algorithm upon the encryption algorithm being keyed with the unique encryption seed; and
    d) transmitting the random quantity to the reception site along with said encrypted portions of each service, but not transmitting the unique encryption seeds produced for each service in step (c)(i).

2. A method according to claim 1 further comprising the step of encrypting the random quantity in accordance with another encryption algorithm upon the encryption algorithm being keyed with a system key prior to performing step (d), and wherein step (d) comprises transmitting the encrypted random quantity.

3. A method according to claim 1 wherein a first component of the random quantity defines a global seed and a second component of the random quantity defines a random seed, and wherein for each service, step (c)(i) comprises:
    a') combining the random seed with the spreading function generated for that service in step (a) in accordance with a data combining function, $F_0$, to produce a unique data quantity;
    b') combining the random seed with the global seed and at least one other quantity in accordance with another data combining function, $F_1$, to produce an intermediate quantity; and
    c') processing the unique data quantity and the intermediate quantity in accordance with a one-way function, at least a portion of the processed data and intermediate quantities defining the unique encryption seed for that service.

4. A method according to claim 3 further comprising the step of encrypting the random quantity in accordance with another encryption algorithm upon said another encryption algorithm being keyed with a system key prior to performing step (d), and wherein step (d) comprises transmitting the encrypted random quantity, and further wherein said at least one other quantity comprises said system key.

5. A method according to claim 1 wherein said services comprise services of different types, and wherein each service is identified by a service number and a service type, and further wherein for each service, step (a) comprises generating a unique spreading function for the service based at least in part upon data representative of the service's number and the service's type.

6. A method according to claim 1 wherein steps (b) through (d) are periodically repeated, and wherein each successive time steps (b) through (d) are performed, a next consecutive portion of each service is encrypted in step (c)(ii) using the respective encryption seeds generated that time in step (c)(i).

7. A method according to claim 1 wherein the following steps are performed at the reception site:
   e) receiving the random quantity and the encrypted portions of each service transmitted in step (d);
   f) selecting one of said services;
   g) regenerating at the reception site, in a manner identical to that performed in step (a), the unique spreading function generated for the selected service in step (a);
   h) convolving, in a manner identical to that performed in step (c)(i), the regenerated spreading function with the received random quantity to reproduce, at the reception site, the unique encryption seed used in step (c)(ii) to encrypt said received encrypted portion of the selected service; and
   i) decrypting said received encrypted portion of the selected encrypted service with the reproduced encryption seed.

8. In a communications system wherein a plurality of encrypted services are transmitted from a transmission site to a reception site, and wherein each of said services was uniquely encrypted at the transmission site by (i) generating a unique spreading function for each service, each spreading function comprising a unique N-bit quantity, (ii) generating a random quantity, (iii) independently convolving the random quantity with the spreading function generated for each service to produce a unique encryption seed for each service, and then (iv) encrypting each service in accordance with an encryption algorithm upon the encryption algorithm being keyed with the respective unique encryption seed produced for that service, and further wherein only the random quantity, and not each of the unique encryption seeds, is transmitted to the reception site along with the encrypted services, a method of decrypting a selected service at the reception site comprising the steps of:
   a) receiving the random quantity and the encrypted services from the transmission site;
   b) selecting one of said received encrypted services for decryption;
   c) regenerating at the reception site, in a manner identical to that performed at the transmission site, the unique spreading function generated at the transmission site for the selected service;
   d) convolving, in a manner identical to that performed at the transmission site, the regenerated spreading function with the received random quantity to reproduce, at the reception site, the unique encryption seed produced at the transmission site and used at the transmission site to key said encryption algorithm in order to encrypt the selected received encrypted service; and
   e) decrypting the selected received encrypted service using the reproduced encryption seed.

9. An encryption apparatus for uniquely encrypting a plurality of services at a transmission site and for transmitting the encrypted services to a remote reception site comprising:
   spreading function generator means for generating a spreading function for each of said services to be transmitted, each spreading function comprising a unique N-bit quantity and being associated with a respective one of said services;
   a random signal generator for generating a random quantity;
   seed generator means electrically coupled to the random signal generator and to the spreading function generator means for independently convolving the random quantity with each of the spreading functions generated by the spreading function generator means to produce a unique encryption seed for each respective service;
   a plurality of service encryptors each electrically coupled to the seed generator means and each electrically coupled to receive a respective one of said services for encrypting the respective service in accordance with an encryption algorithm upon said encryption algorithm being keyed by the unique encryption seed produced for that respective service; and
   a transmitter electrically coupled to the service encryptors and to the random signal generator for transmitting the random quantity and each of the encrypted services to a remote reception site, but not transmitting the unique encryption seeds produced by the seed generator means.

10. An encryption apparatus according to claim 9 further comprising a seed encryptor electrically coupled to the random signal generator and to the transmitter for encrypting the random quantity in accordance with another encryption algorithm upon said another encryption algorithm being keyed with a system key (SK), prior to transmitting the random quantity.

11. An encryption apparatus according to claim 9 wherein a first component of the random quantity defines a global seed and a second component of the random quantity defines a random seed, and wherein said seed generator means comprises a plurality of seed generators each being operative to generate a unique encryption seed for a respective one of said services, each seed generator comprising:
   a first data combiner electrically coupled to receive the random seed and the spreading function for a respective one of the service and being operative to combine the random seed and respective spreading function in accordance with a data combining function, $F_0$, to produce a unique data quantity;
   a second data combiner electrically coupled to receive the random seed, global seed and at least one other quantity and being operative to combine the random seed, global seed and said at least one other quantity in accordance with another data combining function, $F_1$, to produce an intermediate quantity; and
   one-way function means electrically coupled to said first and second data combiners for receiving the data and intermediate quantities therefrom and for processing the data and intermediate quantities in accordance with a one-way function, at least a portion of the processed data and intermediate quantities defining a unique encryption seed for said respective service.

12. An encryption apparatus according to claim 11 wherein said one-way function comprises the Data Encryption Standard algorithm (DES) in electronic codebook (ECB) mode.

13. An encryption apparatus according to claim 9 wherein said services comprise services of different types, and wherein each service is identified by a service number and a service type, and further wherein said spreading function generator means is operative to generate a unique spreading function for a particular service based upon the service number and service type of that particular service.

14. A decryption apparatus for use at a reception site in a communications system wherein a plurality of encrypted services are transmitted from a transmission site to the reception site, and wherein each of said services is uniquely encrypted by an encryption apparatus at the transmission site by (i) generating a unique spreading function for each service, each unique spreading function comprising a unique N-bit quantity, (ii) generating a random quantity, (iii) independently convolving the random quantity with the spreading function generated for each service to produce a unique encryption seed for each service, and then encrypting each service in accordance with an encryption algorithm upon said encryption algorithm being keyed with the respective unique encryption seed produced for that service, and further wherein only the random quantity, and not each of the unique encryption seeds, is transmitted to the reception site along with the encrypted services, said decryption apparatus comprising:
  a receiver for receiving the random quantity and the encrypted services from the transmission site;
  a selection switch for selecting one of said received encrypted services for decryption;
  a spreading function generator for regenerating, in a manner identical to that performed at the transmission site by the encryption apparatus, the unique spreading function generated by the encryption apparatus for the selected service;
  a seed generator electrically coupled to the receiver and to the spreading function generator for convolving, in a manner identical to that performed at the transmission site by the encryption apparatus, the regenerated spreading function with the received random quantity to reproduce the unique encryption seed produced by the encryption apparatus and used to key said encryption algorithm in order to encrypt the selected received encrypted service; and
  a service decryptor electrically coupled to the receiver and to the seed generator for decrypting the selected received encrypted service using the reproduced encryption seed.

15. A decryption apparatus according to claim 14 wherein a first component of the received random quantity defines a global seed and a second component of the received random quantity defines a random seed, and wherein the seed generator comprises:
  a first data combiner electrically coupled to receive the random seed and the regenerated spreading function and being operative to combine the random seed and the regenerated spreading function in accordance with a data combining function, $F_0$, to produce a unique data quantity;
  a second data combiner electrically coupled to receive the random seed, global seed and at least one other quantity and being operative to combine the random seed, global seed and said at least one other quantity in accordance with another data combining function, $F_1$, to produce an intermediate quantity; and
  one-way function means electrically coupled to said first and second data combiners for receiving the data and intermediate quantities therefrom and for processing the data and intermediate quantities in accordance with a one-way function, at least a portion of the processed data and intermediate quantities defining said reproduced encryption seed,
  said data combining functions $F_0$ and $F_1$ being identical to corresponding functions implemented by at least one seed generator in the encryption apparatus, and said one-way function being identical to a corresponding one-way function implemented by said at least one seed generator in the encryption apparatus.

16. A decryption apparatus according to claim 15 wherein said one-way function comprises the Data Encryption Standard algorithm (DES) in electronic codebook (ECB) mode.

17. A decryption apparatus according to claim 14 wherein, prior to transmitting the random quantity to the reception site, the random quantity is encrypted by the encryption apparatus in accordance with another encryption algorithm upon said another encryption algorithm being keyed with a system key, and wherein the decryption apparatus further comprises a memory that contains the system key and a seed decryptor electrically coupled to the receiver for decrypting the received encrypted random quantity using the system key.

* * * * *